United States Patent [19]

Suzuki et al.

[11] Patent Number: 4,509,124
[45] Date of Patent: Apr. 2, 1985

[54] LOCK-UP CONTROL SYSTEM FOR LOCK-UP TYPE AUTOMATIC TRANSMISSION

[75] Inventors: Tadashi Suzuki; Yoshiro Morimoto; Hideo Hamada; Masaaki Suga; Takashi Murasugi, all of Yokosuka, Japan

[73] Assignee: Nissan Motor Company, Limited, Yokohama, Japan

[21] Appl. No.: 362,852

[22] Filed: Mar. 29, 1982

[30] Foreign Application Priority Data

Mar. 30, 1981 [JP] Japan .................................. 56-46975

[51] Int. Cl.³ ...................... G06F 15/20; B60K 41/02; B60K 41/22; F16D 27/16
[52] U.S. Cl. .................................. 364/424.1; 74/866; 192/3.28; 192/3.58
[58] Field of Search ...................... 364/424.1; 74/866; 192/3.28, 3.31, 3.56, 3.58, 30

[56] References Cited

U.S. PATENT DOCUMENTS

| | | | |
|---|---|---|---|
| 3,805,640 | 4/1974 | Schneider et al. | 74/866 X |
| 4,148,231 | 4/1979 | Redzinski | 74/866 |
| 4,386,521 | 6/1983 | Hamada et al. | 192/30 W |
| 4,386,687 | 6/1983 | Chevalier et al. | 192/3.3 |
| 4,414,863 | 11/1983 | Heino | 74/866 |
| 4,422,353 | 12/1983 | Suga et al. | 74/866 |
| 4,449,618 | 5/1984 | Suga et al. | 74/866 |
| 4,457,410 | 7/1984 | Suga et al. | 74/866 |
| 4,471,438 | 9/1984 | Futagi et al. | 364/424.1 |

FOREIGN PATENT DOCUMENTS 37050 10/1981 European Pat. Off. .

*Primary Examiner*—Felix D. Gruber
*Attorney, Agent, or Firm*—Schwartz, Jeffery, Schwaab, Mack, Blumenthal & Koch

[57] ABSTRACT

A lock-up control system is disclosed wherein the lock-up state of a torque converter is temporally released during gear shifting operation in an automatic transmission even if an automotive vehicle is operating in a predetermined lock-up range. A sensor generates an oil temperature compensation signal indicative of the temperature of oil used in the automatic transmission. The time duration of temporary release of the lock-up state is variable with variation in the oil temperature compensation signal.

5 Claims, 4 Drawing Figures

LOCK-UP CONTROL SYSTEM FOR LOCK-UP TYPE AUTOMATIC TRANSMISSION

BACKGROUND OF THE INVENTION

1. Field of the Invention

The present invention relates to a lock-up control system for a lock-up type automatic transmission.

2. Description of the Prior Art

Automatic transmissions are provided with a torque converter in a power transmission system thereof so as to increase a torque from an engine. The torque converter has a pump impeller driven by an engine to rotate oil within the torque converter, wherein the rotation of the oil causes a turbine runner to rotate under the reaction of a stator thereby multiplying the torque (torque converter state). Therefore, the torque converter, while in use, cannot help avoiding a slip between its pump impeller and turbine runner. It results in poor power transmission efficiency that leads to a poor fuel economy. To alleviate this drawback, there has been proposed a so-called a torque converter with a lock-up means for locking the torque converter in a lock-up state, wherein during a relatively high vehicle speed operation range when a torque variation of an engine does not create a problem a turbine runner is directly connected to a pump impeller (lock-up state) thereby eliminating a slip therebetween. A lock-up type automatic transmission provided with a torque converter of this kind in a power transmission system thereof is already employed in some vehicles.

Referring to FIG. 4, there are illustrated lock-up ranges within which the lock-up means locks the torque converter in the lock-up state when the vehicle speed is higher than a predetermined vehicle speed value (lock-up vehicle speed) in each gear position. FIG. 4 shows a shift schedule diagram of a three-speed automatic transmission wherein $V_1$, $V_2$, and $V_3$ are lock-up vehicle speed values for first, second and third gear positions, respectively, and $V_1'$, $V_2'$, and $V_3'$ are lock-up release vehicle speed values for first, second and third gear positions, respectively. In each of the gear positions the torque converter is permitted to lock up when the vehicle speed exceeds a corresponding one of the vehicle speed values $V_1$, $V_2$ and $V_3$. The lock-up state of the torque converter is released when the vehicle speed decreases below the corresponding one of the lock-up release vehicle speed values $V_1'$, $V_2'$ and $V_3'$ so that the torque converter is allowed to operate in a converter state.

As will be understood from FIG. 4, upon gear shifting when the automotive vehicle is operating with a large load, a substantial shock will take place because the torque converter stays in the lock-up state.

SUMMARY OF THE INVENTION

According to the present invention, there is provided a lock-up control system for a lock-up type automatic transmission which hydraulically effects gear shifting using operating oil, wherein an oil temperature sensor generates an electric signal indicative of the temperature of the operating oil and a lock-up clutch is temporarily released for a time which is variable in response to the electric signal generated in part by the oil temperature sensor.

Further according to the present invention, a lock-up control system comprises means for generating a lock-up permission signal, means for generating a gear shift command signal, means for generating an oil temperature signal indicative of temperature of oil used in an automatic transmission, means responsive to the gear shift command signal for generating a lock-up release signal having a time duration variable with variation in the oil temperature signal, and means for generating a lock-up command signal when the lock-up release signal is absent under a condition when the lock-up permission signal is present, but preventing the generation of the lock-up command signal when the lock-up release signal is present even under the condition when the lock-up permission signal is present for a time duration corresponding to the time duration of the lock-up release signal.

An object of the present invention is to provide a lock-up control system wherein the lock-up state is temporally released for a time duration that is variable with variation in actual gear shift duration which is variable in response to the temperature of oil used for gear shifting operation.

BRIEF DESCRIPTION OF THE DRAWINGS

The present invention is specifically described in connection with the accompanying drawings, wherein.

DESCRIPTION OF THE PREFERRED EMBODIMENTS

Figure 1:
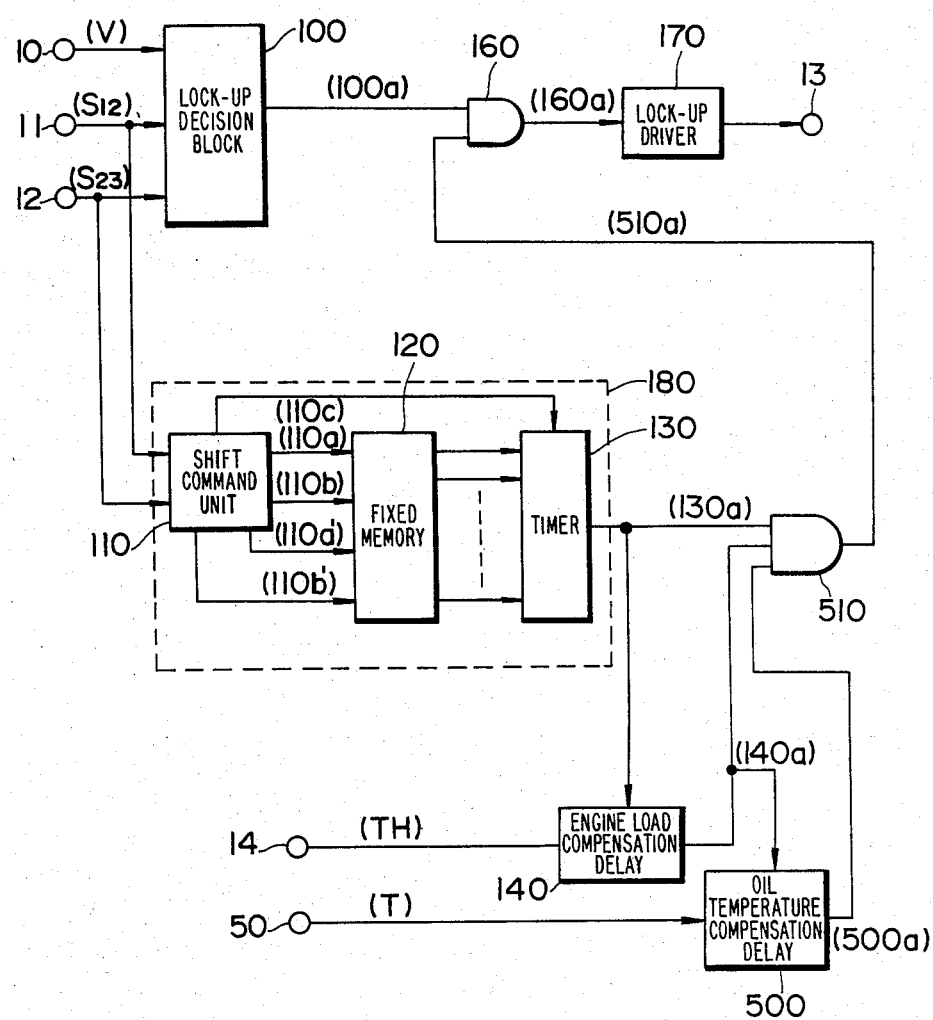
FIG. 1 is a block diagram of a first embodiment of a lock-up control system according to the present invention.
Figure 2:
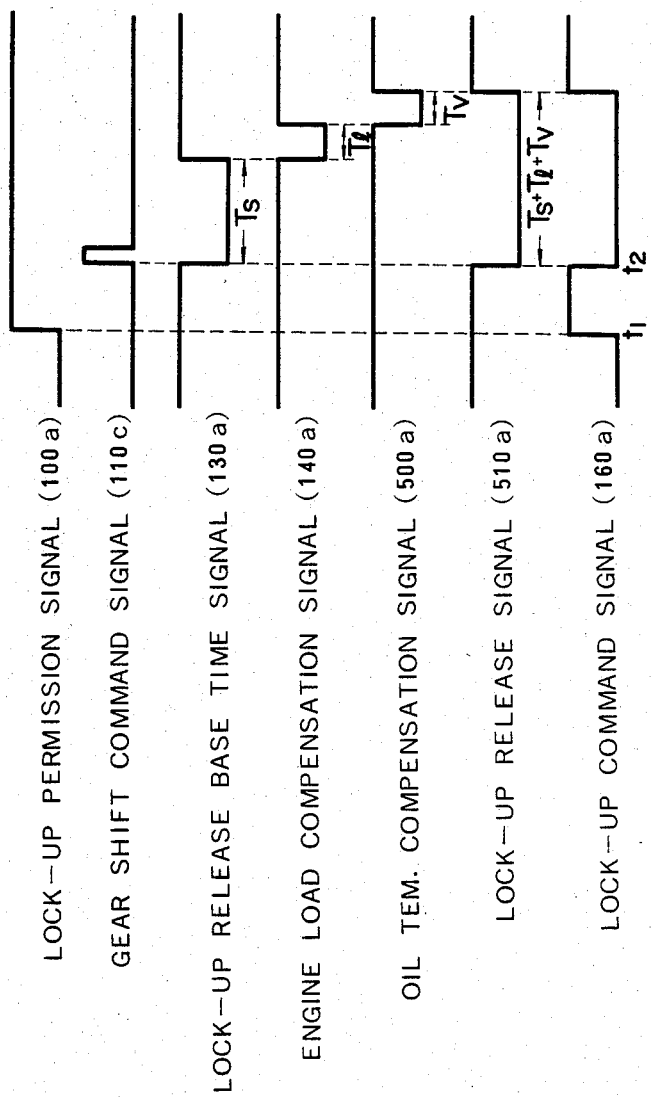
FIG. 2 is a timing diagram of various signals of the control system shown in FIG. 1.

Referring to FIGS. 1 and 2, a first embodiment is described. A lock-up decision block 100 is supplied with a vehicle speed signal V from a vehicle speed sensor 10, a 1-2 shift signal $S_{12}$ from a 1-2 shift switch 11 responsive to position of a 1-2 shift valve, and a 2-3 shift signal $S_{23}$ from a 2-3 shift switch 12 responsive to position of a 2-3 shift valve. The 1-2 shift switch 11 and 2-3 shift switch 12 are built in the 1-2 shift valve and the 2-3 shift valve, respectively. The 1-2 shift switch 11 is closed responsive to the downshift position of the 1-2 shift valve to vary the 1-2 shift signal $S_{12}$ from a H-level to a L-level. The 2-3 shift switch 12 is closed responsive to the downshift position of the 2-3 shift valve to vary the 2-3 shift signal $S_{23}$ from a H-level to a L-level. On the contrary, the 1-2 shift switch 11 is opened responsive to the upshift position of the 1-2 shift valve to vary the 1-2 shift signal $S_{12}$ from L-level to H-level, and the 2-3 shift switch 12 is opened responsive to the upshift position of the 2-3 shift valve to vary the 2-3 shift signal $S_{23}$ from L-level to H-level.

Figure 4:
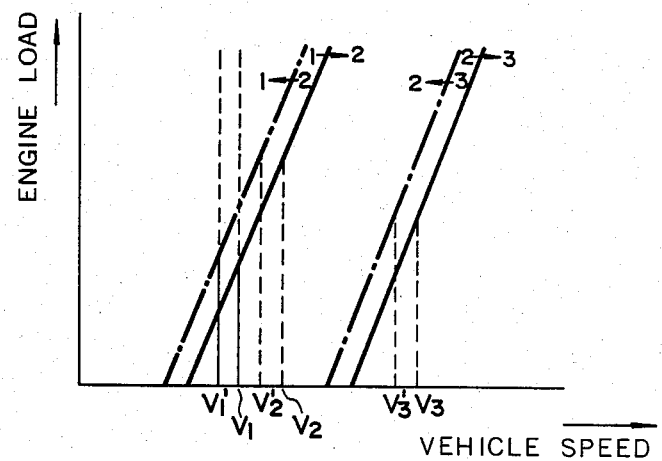
FIG. 4 is a shift schedule diagram.

The lock-up decision block 100 determines the current gear position in response to the combination of levels of the shift signals $S_{12}$ and $S_{23}$. The block 100 compares the current vehicle speed indicated by the vehicle speed signal V with a set of predetermined lock-up vehicle speed values $V_1$, $V_2$ and $V_3$ as shown in FIG. 4 (when the torque converter is in converter state) or a set of predetermined lock-up release vehicle speed values $V_1'$, $V_2'$ and $V_3'$ as shown in FIG. 4 (when the torque converter is in lock-up state). If the vehicle operates within any one of the lock-up ranges, then the block 100 generates a H-level lock-up permission signal 100a, while, if the vehicle operates in any one of converter ranges, it generates a L-level signal 100a.

The block 100 may comprise a gear ratio decision circuit connected to a 1-2 shift switch 60 and a 2-3 shift switch 61, a plurality of AND gates, a vehicle speed decision circuit connected to vehicle speed sensor 62 and an OR gate. These nonessential details are described in U.S. application Ser. No. 280,818 entitled "LOCK-UP CONTROL SYSTEM FOR LOCK-UP TYPE AUTOMATIC TRANSMISSION," filed on July 6, 1981 commonly assigned herewith, the disclosure of which is hereby incorporated by reference in its entirety.

The lock-up release signal 100a is fed to one of two inputs of an AND gate 160 which has its other input connected to an AND gate 510 to receive a lock-up release signal 510a (see FIG. 2). As shown in FIG. 2, the L-level lock-up release signal 510a commences with the commencement of a H level gear shift command signal 110c and has a time duration which is the total of the duration Ts of a lock-up release base time signal 130a, the duration Tl of an engine load compensation signal 140a and the duration Tv of an oil temperature compensation signal 500a.

The actual time necessary for the gear shifting operation from the second to third gear position increases as the temperature of the oil used for gear shifting in the automatic transmission decreases. For example:

| oil temperature | time |
|---|---|
| 80~90° C. | 1 sec |
| −9° C. | 1.6 sec |
| −13° C. | 2.9 sec |

The time duration Tv of the oil temperature compensation signal 500a should be determined in due consideration of the above relationship.

Referring to a block 180 which generates the lock-up release base time signal 130a, it includes a portion 110 which generates a timer trigger signal 110c in response to change in level of the 1-2 shift signal $S_{12}$ and/or 2-3 shift signal $S_{23}$. The timer trigger signal 110c is fed to a timer 130. The portion 110 also generates signals 110a' and 110b' representing a gear position prior to a gear shifting operation and signals 110a and 110b representing a gear position after the gear shifting operation. These signals 110a', 110b', and 110a and 110b are fed to a fixed memory 120 which contains fixed lock-up release data. Based on these signals, a kind of shift which is to take place is determined and a predetermined lock-up release time base Ts corresponding to which kind of shift is addressed as shown in the following Table. The addressed lock-up release base time Ts is fed to the timer 130 in the form of an 8 bit digital signal.

| | Address | | | |
|---|---|---|---|---|
| | gear position before shifting | | gear position after shifting | |
| kinds of shift | 110b' | 110a' | 110b | 110a |
| 1-2 shift | 0 | 1 | 1 | 0 |
| 1-3 shift | 0 | 1 | 1 | 1 |
| 2-1 shift | 1 | 0 | 0 | 1 |
| 2-3 shift | 1 | 0 | 1 | 1 |
| 3-1 shift | 1 | 1 | 0 | 1 |
| 3-2 shift | 1 | 1 | 1 | 0 |

The timer 130 is triggered by the rise in timer trigger signal 110c and changes the lock-up release base time signal 130a to a L-level and maintains the L-level for the above-mentioned predetermined time Ts in response to the signal from memory 120 and allows the signal 130a to return to H-level again after the expiration of the time Ts indicated by the signal from memory 120.

The block 180 may include shifting detector circuits and a NOR gate as disclosed in the co-pending U.S. application Ser. No. 280,818 incorporated above. In this case, the lock-up release base time signal is issued from the output of the NOR gate.

The lock-up release base time signal 130a is fed to one of three inputs of an AND gate 510 and is also fed to a block 140 which normally generates a H-level engine load compensation signal 140a. The level of the engine load compensation signal 140a changes from H-level to L-level in response to the rising of the lock-up release base time signal 130a. The L-level is maintained for a time duration Tl which is determined based upon an engine load signal TH indicative of engine load from an engine load sensor 14. The level of the signal 140a changes again to H-level after the expiration of the time duration Tl.

The engine load compensation signal 140a is fed to the second of the three inputs of the AND gate 510 and is also fed to a block 500. The block 500 is supplied with an oil temperature signal T from an oil temperature sensor 50.

Referring to the oil temperature sensor 50, it comprises a thermistor or the like which is attached to the transmission case. The thermistor varies its resistance with variation in oil temperature in the automatic transmission. This variation is produced in terms of electric voltage as an oil temperature signal T. The engine coolant varies with variation in temperature in actuating oil in the automatic transmission under most conditions. Thus, the oil temperature sensor 50 may be replaced with an engine coolant temperature sensor.

Referring back to the block 500, it normally generates a H-level oil temperature compensation signal 500a. The level of the oil temperature compensation signal changes from a H-level to a L-level upon rising of the engine load compensation signal 140a and this L-level is maintained for a time duration Tv variable depending on the oil temperature signal T. Upon expiration of the time duration Tv the level of the oil temperature compensation signal 500a changes to H-level again. The oil temperature compensation signal 500a is fed to the third of the three inputs of the AND gate 510.

The lock-up release base time signal 130a, engine load compensation signal 140a and oil temperature compensation signal 500a are impressed to three inputs of the AND gate 510. Therefore, the lock-up release signal 510a is switched to a L-level for a time duration Ts+Tl+Tv beginning with an instance $t_2$ when the timer trigger signal 110c appears (see FIG. 2). Since the L-level lock-up release signal 510a is fed to the AND gate 160, a lock-up command signal 160a is switched to a L-level even when the lock-up permission signal 100a is in H-level and keeps the L-level for the time duration Ts+Tl+Tv. Signal 160a is applied to a lock-up driver 170 which produces a signal causing lock-up at 13. Therefore, the lock-up is released for this time duration even if the vehicle is operating in the lock-up range, so that the shock inherent to gear shifting operation is alleviated.

From the foregoing description, it will now be understood that since the lock-up release time is varied depending upon the temperature of the oil used for gear shifting operation in the automatic transmission to appropriately adjust the actual lock-up release time, it is possible to vary the lock-up release time with variation of actual shift operation time depending upon variation in the temperature in the oil in the automatic transmission, thus preventing racing of the engine or occurrence of shift shock during shifting operation, resulting in an improvement in the smoothness of the ride.

Figure 3:
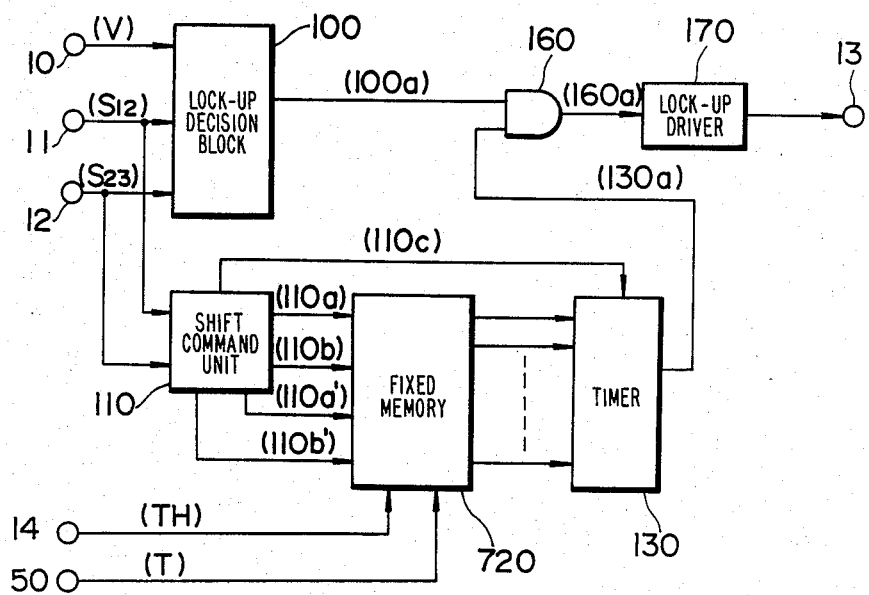
FIG. 3 is a second embodiment according to the present invention.

Referring to FIG. 3, a second embodiment is described. The second embodiment is different from the first embodiment just described in that an engine load sensor 14 is in the form of an accelerator switch operatively connected with an accelerator pedal to be opened or closed thereby. An oil temperature sensor 50 is in the form of a bimetal switch. Besides, the memory 120 has been replaced with a fixed memory 720 which stores respective lock-up release times against kinds of shift, engine load and oil temperature. The fixed memory 720 is supplied with signals 110a' and 110b' representing a gear position prior to a gear shifting operation and signals 110a and 110b representing a gear position after the gear shifting operation, an engine load signal TH from the accelerator switch 14 and an oil temperature signal T from the oil temperature sensor 50.

The memory 720 judges the kind of shift from the signals 110a, 110b, 110a' and 110b', engine load from engine load signal TH and oil temperature from oil temperature signal T. Based on the result, the optimum lock-up release time is read out from the stored data corresponding to the kind of shift, engine load and oil temperature. This optimum lock-up release time is supplied in terms of a signal to a timer 130.

Another possible construction to achieve the objective of the present invention is to use analog signals as an engine load signal and as an oil temperature signal. Each of these signals would then be compared with different threshold values which define various ranges depending upon the magnitude of each of the analog signals. For various ranges thus defined, the optimum lock-up release time is stored in a fixed memory and the stored data in the fixed memory is selectively used to determine the optimum lock-up release time.

It is also possible to use a micro-computer to effect the necessary process for the control based upon the stored data in the fixed memory.

What is claimed is:

1. A lock-up control system for a lock-up type automatic transmission of an automotive vehicle having an engine, the lock-up type automatic transmission including a torque converter with a lock-up means responsive to a lock-up command signal for locking the torque converter in a lock-up state, the torque converter being shiftable between said lock-up state and a torque converter state, the lock-up control system comprising:

means for generating a lock-up permission signal indicating that the automotive vehicle is operating within a predetermined lock-up range;

means for detecting a command to shift gears and for generating a timer trigger signal in response to the presence of said command;

means for detecting a temperature of actuating oil used for effecting gear shifting in the automatic transmission and for generating an oil temperature signal indicative of said temperature;

timer means responsive to said timer trigger signal and said oil temperature signal for determining a time duration required for the transmission to effect gear shifting resulting from said command indicated by said timer trigger signal and for generating a lock-up release signal indicative of said time duration, said time duration being variable at least with variation in said oil temperature signal; and means for generating the lock-up command signal when said lock-up release signal is absent and said lock-up permission signal is present, but preventing the generation of the lock-up command signal when said lock-up release signal is present even under the condition when said lock-up permission signal is present for said time duration indicated by said lock-up release signal.

2. A lock-up control system for a vehicle equipped with a lock-up type automatic transmission, said transmission being responsive to a shift command to shift from one gear to another and including a torque converter which assumes one of a lock-up state and a torque converter state in response to a lock-up command signal, the lock-up control system comprising:

means for sensing values of predetermined operating parameters of said vehicle and for generating a lock-up enable signal when said values indicate said vehicle to be operating within a predetermined lock-up range;

means for detecting the presence of said shift command and for generating a timer trigger signal in response to a positive detection of the presence of said shift command;

means for sensing the temperature of transmission fluid within said transmission and for generating a temperature signal indicative of said sensed transmission fluid temperature;

means responsive to said temperature signal and said timer trigger signal for determining a time duration required for said transmission to shift gears in response to said shift command and for generating a lock-up inhibit signal indicative of said time duration, said time duration being determined at least in accordance with said temperature signal; and means responsive to said lock-up enable signal and said lock-up inhibit signal for generating a lock-up command signal in response to the presence of said lock-up enable signal and the absence of said lock-up inhibit signal; and for not generating said lock-up command signal in the presence of said lock-up inhibit signal.

3. A lock-up control system for a lock-up type automatic transmission of an automotive vehicle having an engine, the lock-up type having a hydraulic control system and being shiftable into any one of a plurality of alternate gear positions and including a torque converter with a lock-up means responsive to a lock-up command signal for locking the torque converter in a lock-up state, the torque converter being shiftable into the lock-up state or a torque converter state, the lock-up control system comprising:

means for generating a lock-up permission signal indicating that the automotive vehicle is operating within one of a plurality of lock-up ranges which are respectively predetermined for each of the plurality of gear positions;

means for detecting a command for gear shifting occurring in the hydraulic control system and generating a timer trigger signal in response to a positive detection by said detecting means;

means for detecting a load on the engine and for generating an engine load signal indicative of said load on the engine;

means for detecting a temperature indicative of the temperature of oil used for actuating gear shifting in the automatic transmission and generating an oil temperature signal indicative of said indicative temperature;

means, responsive to said trigger signal, said oil temperature signal, and said engine load signal for determining a time duration required for the transmission to effect gear shifting resulting from said command indicated by said gear shift command signal, and for generating a lock-up release signal indicative of said time duration, said time duration being variable with variation in said engine load signal and said oil temperature signal; and means for generating the lock-up command signal when said lock-up release signal is absent and said lock-up permission signal is present, and for preventing the generation of the lock-up command signal when said lock-up release signal is present for said time duration indicated by said lock-up release signal.

4. A lock-up control system as claimed in claim 2, wherein said lock-up release signal generating means includes means for storing a plurality time duration data corresponding respectively to each different shifting from one gear to another gear and for generating an output signal indicative of one of the stored time duration data corresponding to the gear shifting resulting from said command indicated by said gear shift command signal, timer means responsive to said output signal for generating a lock-up release base time signal, means responsive to said temperature indicative signal for generating an oil temperature compensation signal, and means for summing said lock-up release base time signal, said engine load compensation signal and said oil temperature compensation signal.

5. A lock-up control system as claimed in claim 3, wherein said lock-up release signal generating means includes means for storing lock-up release time data which corresponds to each different combination of said engine load signal, said oil temperature signal, and the gear shifting resulting from said command indicated by said gear shift command signal.

* * * * *